United States Patent [19]
Gouirand

[11] 3,822,908
[45] July 9, 1974

[54] AIR SUSPENSION WITH TAPERED AIR BAG

[75] Inventor: Rene Gouirand, New York, N.Y.

[73] Assignee: Joseph Mercadante, Greenwich, Conn.

[22] Filed: Nov. 6, 1972

[21] Appl. No.: 304,219

Related U.S. Application Data

[62] Division of Ser. No. 110,704, Jan. 28, 1971.

[52] U.S. Cl.............................. 293/68, 280/124 F
[51] Int. Cl............................................ B60r 19/00
[58] Field of Search............ 293/68; 280/124 F, 124

[56] References Cited
UNITED STATES PATENTS

| | | | |
|---|---|---|---|
| 2,913,252 | 11/1959 | Norrie | 280/124 F |
| 2,941,816 | 6/1960 | Benson | 280/124 F |
| 3,073,621 | 1/1963 | Wedzinga | 280/124 F |
| 3,689,054 | 9/1972 | Gouirand | 293/68 |
| 3,692,325 | 9/1972 | Gouirand | 293/68 |

Primary Examiner—Philip Goodman
Attorney, Agent, or Firm—Mattern, Ware and Davis

[57] ABSTRACT

An air bag having a tapered cross-section in the direction of the length of the vehicle has one surface mounted to the vehicle frame. The other surface of the air bag contacts a suspension member which extends outward (as a lever member) from the greater cross-sectional portion of the air bag and the vehicle axle is attached thereto. In one embodiment the suspension member is flexibly coupled to the chassis by flexible cables, or the like, including side cables which prevent side-sway of the vehicle.

3 Claims, 7 Drawing Figures

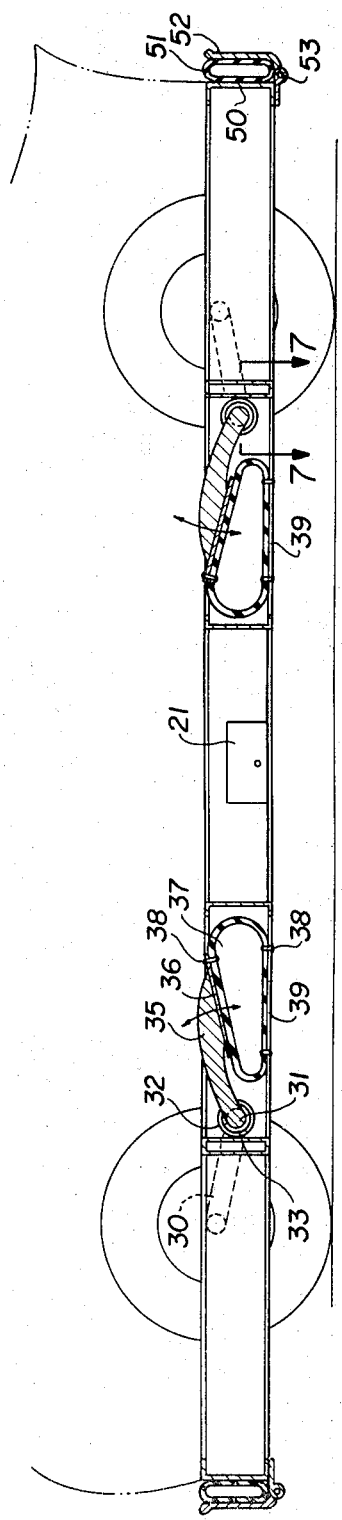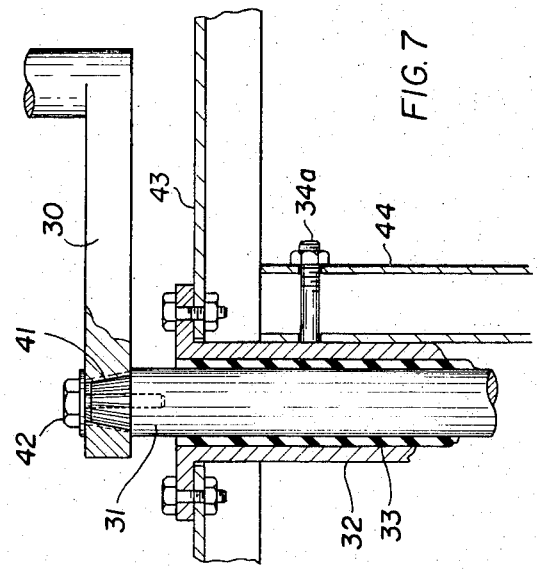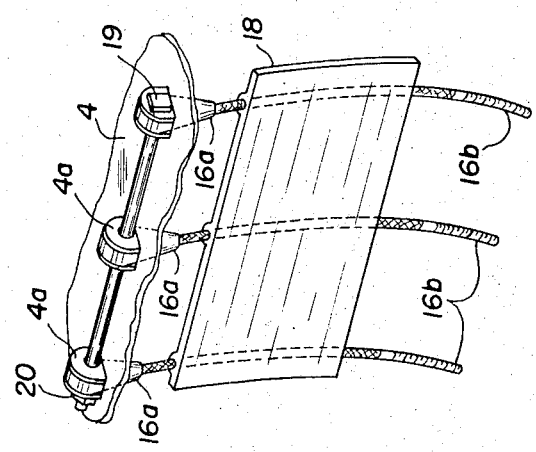

3,822,908

AIR SUSPENSION WITH TAPERED AIR BAG

This is a division, of application, Ser. No. 110,704, filed Jan. 28, 1971.

This invention relates to air suspension systems for vehicles, and more particularly, for vehicle air suspensions using tapered air bags and wherein the load is applied to the air bags by lever or cantilever action.

The main object of the present invention is to provide improved, reliable, air suspension systems which have a reduced number of moving parts, are simple in construction and are economical to manufacture, require little or no periodic lubrication and provide a smooth vehicle ride.

Another object of the present invention is to provide improved air suspension systems which are suitable for use in both pleasure vehicles and light and heavy duty trucks or the like.

Yet another object of the present invention is to provide a safety feature which includes an air bumper which is in air-communication with the air suspension system in order to enhance the performance of both the air bumper and the suspension system.

A further object of the present invention is to provide an embodiment having a true "floating" action and which is self-aligning, thereby reducing heating up, and the resulting wear, on the tires. Also, fatigue on the metal components of the suspension system is reduced.

SUMMARY OF THE INVENTION

According to this invention, a vehicle suspension system comprises a plate-like chassis member, a plate-like suspension member, and air bag having a tapered cross-section in the direction of the length of the vehicle and located between the chassis member and the suspension member. Further provided is means coupling a vehicle axle to the suspension member such that the substantial portion of the vehicle load is applied at the widest cross-sectional portions of the air bag.

According to a further preferred feature of the invention, the vehicle axle is connected to the suspension member in a cantilever-type manner and the axle is spaced from the air bag in the direction of the length of the vehicle. Using this configuration, by varying the length of the cantilever, the characteristics of the vehicle ride can be varied. By lengthening the cantilever, the vehicle ride is effectively mad smoother since the suspension system will allow greater up and down motions of the axle.

In accordance with a further aspect of this invention, safety air-bumpers are provided which are in air-communication with the air in a suspension system air bag. The air in the air bumpers acts an an additional air reservoir for the air bags of the suspension system to effectively soften the ride of the vehicle and enhance the performance of the suspension system. Additionally, the air bumper absorbs vehicle impacts. The air in the suspension system enhances the impact absorption characteristics of the bumper.

DRAWINGS

FIG. 5 is a side view of the embodiment of FIG. 1;

FIG. 6 is an illustration of typical cables for use in the embodiment of FIG. 1; and FIG. 7 illustrates a modified axle construction to facilitate vehicle height adjustment.

DETAILED DESCRIPTION OF THE DRAWING

Figure 1:
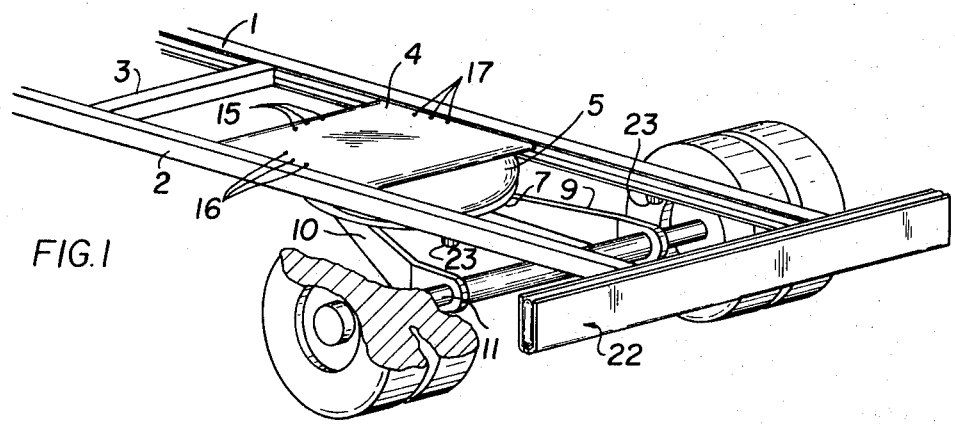
FIG. 1 is a perspective view of an embodiment of the present invention for use as the rear suspension for a truck and which provides "floating" action.
Figure 2:
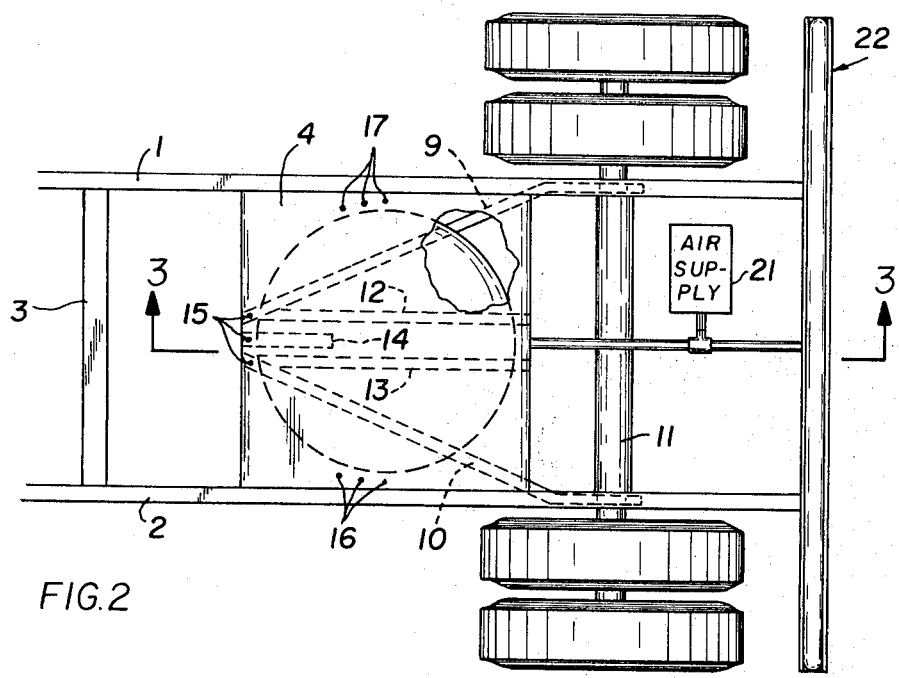
FIG. 2 is a top view of the embodiment of FIG. 1.
Figure 3:
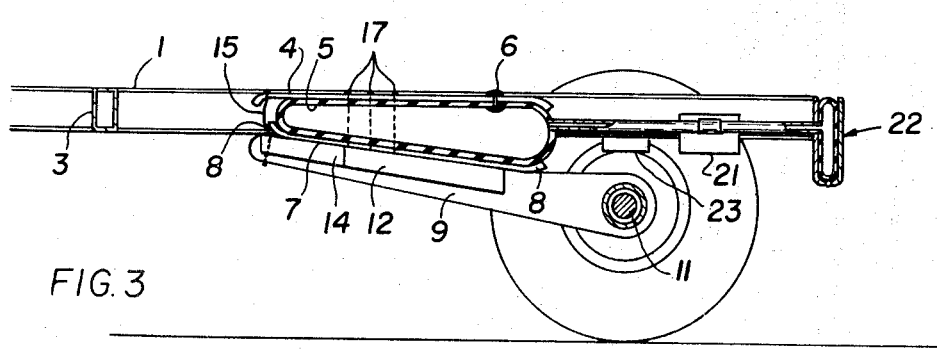
FIG. 3 is a side view of the embodiment of FIG. 1.

Referring to FIGS. 1-3, a truck chassis is comprised of longitudinal chassis members 1 and 2 and a cross member 3. Additional cross members in any suitable configuration can be provided as required, depending upon the strength desired in the vehicle. The steering, braking and drive mechanism for the vehicle is not shown so as not to unduly complicate the description. These mechanisms, and the interconnection to the vehicle wheels, should be apparent to those ordinarily skilled in the art. The particular design of the chassis members is not relevant to the present invention. The air suspension can be retrofitted into many existing chassis.

Secured to the frame members 1 and 2 is an upper plate 4 to which is secured an air bag 5, preferably made of rubber or the like, having a tapered cross section in the longitudinal direction of the vehicle. The air bag may be bolted to the plate 4 by means of bolts molded into the air bag 5. One such bolt 6 is shown by way of example in FIG. 3. The outer periphery in the top view (FIG. 2) of the air bag 5 is round in the embodiment described. Bearing on the lower end of the air bag 5 is a lower plate 7 which is substantially round and conforms generally to the shape of the air bag 5. Plate 7 has an upwardly extending lip portion 8 which generally conforms to the cross sectional contour of the air bag 5 as most clearly illustrated in FIGS. 1 and 3. Plate 7 is preferably bolted to air bag 5 in the same manner as plate 4 by means of molded in bolts such as bolt 6 of FIG. 3.

Secured to the lower surface of lower plate 7 are axle support members 9 and 10 which retain the axle 11 in position. Support members 9 and 10 are secured to lower plate 7 by bolting, welding, or the like and additionally reinforce and stiffen lower plate 7. Reinforcing members 12 and 13 are also secured to lower plate 7 and at their front ends to support members 9 and 10, respectively. A cable connecting and further reinforcing member 14 is also secured to lower plate 7. Bumper pads 23 are provided on chassis members 1 and 2 to absorb shocks if the suspension system bottoms under extremely severe conditions.

Three cables 15 are provided to flexibly join the front end of lower plate 7 to upper plate 4. The cables 15 provides a flexible "pivot-type" point for the axle support structure upon impact. Left side cables 16 and right side cables 17 are provided to maintain the components in their relative positions upon impact, during rebound after an impact, and also, prevent side-sway of the vehicle. The side cables also bear on the air bag 5 upon severe impact and when the bag tends to deform. The cables provide a flexible component restraining means which is also capable of absorbing shock or impact.

Preferably each set of cables 15, 16 and 17 comprise three individual cables as shown in FIGS. 1-3. The rearmost side cables are preferably located at approximately the center of the air bag 5 (as is more clearly seen in FIG. 3) and the other two side cables is each set are located forward thereof. A typical construction of a set of cables is shown in detail in FIG. 6.

Referring to FIG. 6 a set of cables 16, for example, includes three spaced cables 16 embedded in a shield member 18. Shield 18 is to prevent rubbing of the air bag by the cables prevents wearing out of the air bag by the action of the cables. Shield 18 may be made of plastic material, rubber, nylon, or any other suitable material. One end of the cables have eyelets 16a thereon which engage with alternate mating eyelets 4a formed on upper plate 4. When the eyelets 4a and 16a are in mating position, a bolt 19 is pushed through the eyelets and secured in place with a nut 20. This flexibly secures cables 16 to plate 4.

The other ends 16b of cables 16 are threaded and pass through holes formed in the reinforcing members of the lower plate 7 or through holes formed in lower plate 7. A nut (not shown) is threaded onto the threaded ends 16b of the cables to secure same to the vehicle. The tension on the cables is adjusted by varying the degree of engagement of the nuts with the cables. If desired, a rubber cushioning bush may be interposed between the nuts and the lower plate 7, and/or, rubber bushes can be located in eyelets 16a to provide additional resiliency.

The axle 11 is cantilevered out from the end of the air bag 5. Substantially the whole vehicle load is applied to the largest cross-sectional portions of the tapered air bag 5 as is better seen in FIG. 3. Very little of the load is absorbed at the narrow end of the air bag, that is, the portions closes to cables 15. This type of configuration gives excellent "floating" suspension action and will provide a smooth ride. A great deal of flexibility is provided and a sway bar is not required. Additionally, since there is no rigid interconnection between the vehicle axle 11 and the chassis 1, 2, the suspension is self-aligning for unbalanced laods. This reduces drag on the wheels and increases tire life. The configuration of FIGS. 1–3 comprises very few moving parts and requires no periodic lubrications and no periodic maintenance.

In order to obtain a smoother ride, the leverage could be increased by moving the axle 11 farther away from the center of the suspension. This will allow more up and down motions of the wheels and may be preferable in certain instances. Alternatively, by moving the axle 11 closer to the center of the air bag, the up and down motions of the wheels will be more restricted and the ride will be less smooth.

In the embodiment of FIGS. 1–3, the ride may also be softened by moving the bolts 6 to a more forward position to allow greater flexing of the large cross-sectional portion of the air bag 5 to thereby provide greater freedom of motion.

The configuration of FIGS. 1–3, by application of the bulk of the load to the largest portions of the air bag 5, enables more efficient utilization of space. If the air bag 5 was of uniform cross section, as would be expected in view of known prior art designs, then the front portion of the suspension system in the area of cables 15 would necessarily be made lower to the ground if the rear portion of the bag is designed for the maximum loads. This unnecessarily consumes space, increases the weight since more material is used and increases the bulk of the air bag used. By virtue of the tapered air bag, an improved system results.

The air bag 5 may be disc-shaped (as shown) or may be doughnut-shaped. The air bag 5 is connected to an air supply system 21 which is conventional in design. The air supply and bag 5 is also connected to an air bumper 22 which will be described in detail below with reference to the embodiment of FIGS. 4 and 5. In addition to being a safety feature, the bumper 22 provides an additional air reservoir for bag 5, thus improving the shock absorption characteristics of the present invention.

Figure 4:
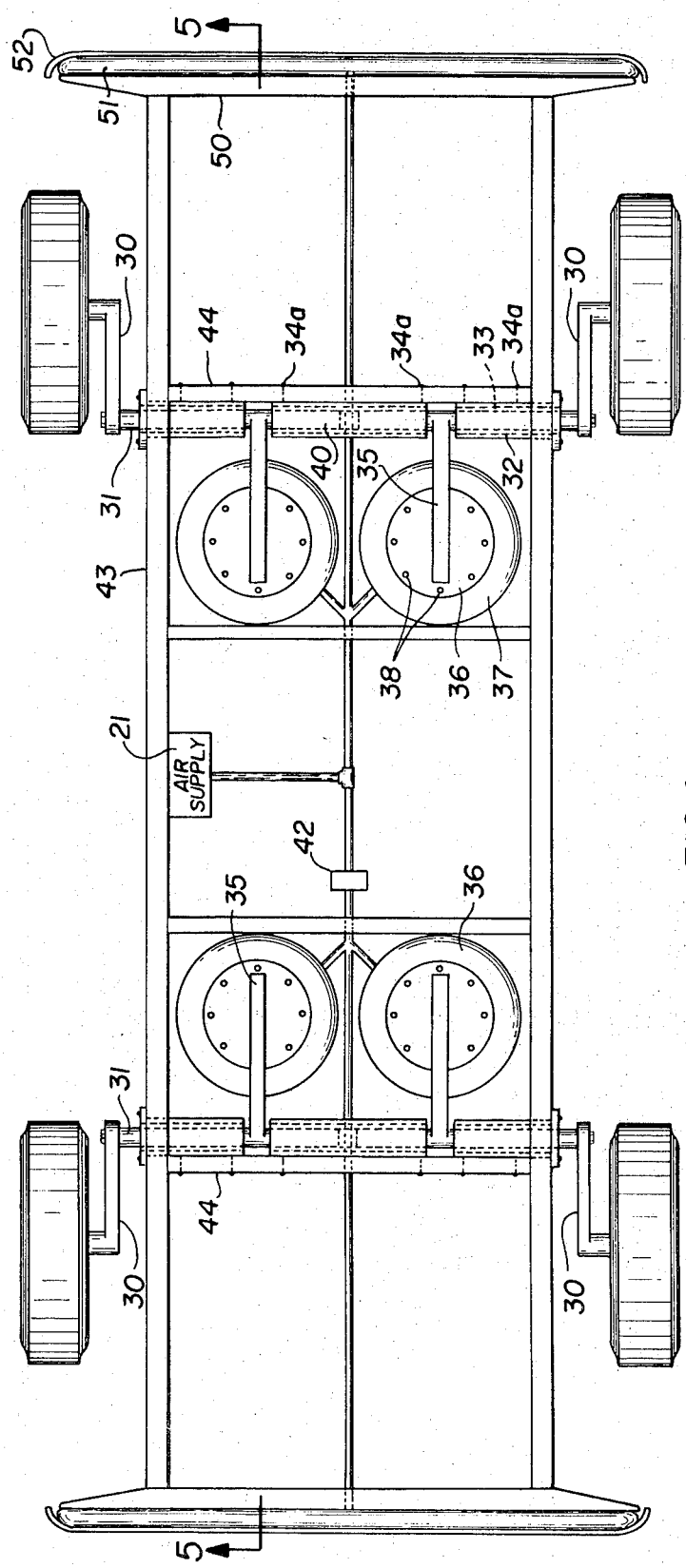
FIG. 4 is a top view of an embodiment of the present invention for use in passenger vehicles and in light duty trucks.

Referring to FIGS. 4 and 5, there is shown an embodiment of the present invention particularly suitable for use in passenger automobiles or in small trucks. The illustrated embodiment has independent suspension on all four wheels. However, this is not necessarily required. The steering, braking and drive mechanism for the vehicle is not shown so as not to unduly complicate the description. These mechanisms, and the interconnection to the vehicle wheels, should be apparent to those ordinarily skilled in the art.

As shown in FIGS. 4 and 5, all four wheel suspensions are substantially identical. Therefore, only one wheel suspension will be described in detail. One wheel suspension in FIG. 4 is shown in cross-section to facilitate an understanding of the invention.

A wheel suspension member 30 extends from an axle 31. Member 30 and axle 31 may be integrally formed or may be separate members secured together, as described with respect to FIG. 7. Axle 31 is mounted within a tubular member 32 and a rubber body 33 is located between the shaft 31 and tubular member 32. Rubber body 33 acts as a bearing member and also absorbs some shock. The tubular member 32 is connected to a vehicle chassis member 34 by welding, bolting, or other equivalent manner. Bolts 34a are shown merely by way of example. Axle 31 extends through tubular member 32 and into another tubular member 40 which is also secured to chassis cross member 34 by bolts 34a, for example. Member 40 is common to two axles as is clearly seen in FIG. 4, the axles being independent of each other. Interposed between the axle 31 and tubular member 41 is a rubber body 41 which acts as a bearing and absorbs shock.

Rigidly connected to the axle 31 is a suspension member 35 which acts as a lever arm and which is further connected to a circular plate member 36. Plate 36 is secured to the upper surface of a tapered air bag 37 by means, for example, of bolts 38 molded into the air bag 37. The narrow portion of the air bag 37 is closest to the vehicle axle and the widest portion of the air bag 37 is located remote from the axle 31. The lower surface of the air bag 37 is supported by a plate 39 which preferably forms part of the vehicle chassis. The particular design and shape of support member 39, and its inter-relationship to the chassis, is irrelevant as long as the proper support for the air bag 37 is provided.

In the embodiment of FIGS. 4 and 5, as the vehicle wheel is subjected to shock, the bulk of the applied load on the air bag 37 is applied at the widest cross-sectional portion thereof. Thus, the air bag 37 is effectively shaped to absorb shocks in accordance with the intensity of the shock applied at the various portions thereof. The load capabilities of the air bag is in conformance with the distribution of the applied load.

The vehicle ride can be made smoother by providing a longer suspension arm 30. The particular design of the arm 30 is determined by the requirements for the particular vehicle.

The ride can also be made smoother by locating the bolts 38 which secure the air bag to lower chassis members 39 closer to the narrow portions of the air bag. This allows more free flexing of the air bag, thus smoothing the vehicle ride. Also the bolts 38 securing the air bag to plate 36 can be placed on a smaller bolt circle to effectively allow more free flexing of the air bag to provide a smoother vehicle ride. Further, by relocating the bolts 38 the ride characteristics are changed. By reducing the size of plate 36, the ride is also effectively made smoother since more motion of the movable members is permitted. In summary, the greater the free flexing area of the air bag, the smoother will be the vehicle ride. All of the above consideration, as well as the material from which the air bag is made, should be taken into account in vehicle design to provide the desired ride characteristics.

As is clearly seen in FIG. 5, the design of the present invention efficiently utilizes space. If the air bag were designed with a uniform cross section as would be most probable when using prior art techniques, it would be necessary to locate the arm 35 higher up in the passenger portion of the vehicle. This is because, in order to provide the desired load carrying capability, the air bag would need a uniform cross-section corresponding to the widest shown in FIG. 5, thus filling the space in the chassis compartment of FIG. 5. As shown in the present invention, part of arm 35 may be accommodated in the chassis space.

While the embodiment of FIGS. 4 and 5 utilizes 4-wheel independent suspension, and therefore utilizes four air bags — one for each wheel — the construction can be modified so that, for example, both rear wheels are coupled together on a common shaft and utilize a single air bag. The operation of such a rear suspension system is similar to that described for the independent wheel suspension and is not described herein. Also, a rear suspension similar to that shown in FIGS. 1–3, scaled down for lighter duty use, may be incorporated into the embodiment of FIGS. 4 and 5.

In the embodiments of FIGS. 1–5, improved performance and an additional safety feature may be provided by including an air bumper. In such a system, the air bumper is connected to the air bags of the suspension system either directly or through an intermediate air chamber or supply means. A typical bumper is illustrated in FIGS. 4 and 5 and comprises a chassis cross member 50 against which an elongated air bag 41 is secured by bolts or the like molded into the air bag. Pivotally secured to the vehicle chassis is an outside bumper plate 52, preferably made of metal or other rigid material which is also bolted or otherwise secured or bonded to air bag 51. The pivot members 53 are shown generally and the particular design thereof should be apparent. Alternatively, the outside bumper plate 52 may be maintained in position by means of a cable extending from the upper portion of bumper plate 52 over the top of the air bag 51 and secured to the vehicle chassis plate 50. In this event, it is not necessary to bolt air bag 51 to plates 50 and 52. Preferably, an air line interconnects the air bag 51 with the air suspension system. The air bag 51 will effectively absorb most small external shocks applied to the vehicle bumper plate 52 and the air contained in the air bag will additionally act as an air reservoir for the suspension system and as a cushion for improving the softness of the ride of the vehicle. The air bag 51 effectively acts as an additional air reservoir for the suspension system since they are in air-communication with each other. The air in the suspension system likewise helps absorb shocks applied to the air bumper. This enhances the ride of the vehicle and provides improved overall vehicle performance. A similar bumper configuration may be utilized at the other end of the vehicle. Such an air-bumper is suitable for use in all types of vehicles including trucks, automobile, etc., and even with other types of air or other fluid suspension systems.

With the present invention the vehicle road clearance may be easily adjusted by varying the air pressure. The driver preferably has a control coupled to the air supply 21 to enable manual as well as automatic control of air pressure and thereby, of vehicle road clearance.

The vehicle road clearance may also be adjusted by varying the position of suspension arm 30 relative to the axle 31. FIG. 7 illustrates a simplified embodiment for enabling such an adjustment to be easily effected.

The end of axle 31 terminates in a generally cone-shaped end and the end of the suspension arm 30 remote from the wheel has a mating conical recess. Preferably, the conical end and recess have mating grooves or serations to help maintain them in a desired relative position. A bolt 31a passes through arm 30 and threadably engages axle 31 to secure the arm 30 and axle 31 together. To adjust vehicle height, the vehicle is jacked up or otherwise lifted, bolt 31a is sufficiently loosened, the relative position of arm 30 with respect to axle 31 is adjusted and the bolt 31a tightened. Then the vehicle is lowered. It should be clear that other equivalent height adjustment designs may be implemented by those skilled in the art.

The air bag shown in the figures is shown merely by way of example. It should be clear that various other configurations may be used as the tapered air bag. For example, it is not necessary that the air bag be round as shown in the drawings. The air bag may take an oval or other desired peripheral shape. Also, the air bag may take the form of a "doughnut" shape — that is, with a void in the center thereof. The exact shape of the air bag is a matter of design as long as the basic constructional features of the tapered cross-section in the length of the vehicle is maintained.

In the embodiment of FIGS. 1–3, it is preferable that the cables 15 secured to the front ends of the plates 4 and 7 are arranged with the central cable 15 substantially vertical and the two outer cables 15 diverging from the central cable toward the lower ends of the cables. The resulting configuration has the appearance of two inverted "V's" placed side by side and having one common leg (the central cable 15 being the common leg). By virtue of this arrangement, by varying the degree of tightness of the two outside cables, the rear wheel suspension can be precisely aligned in a relatively simple manner.

The term "air" is used in this specification and in the claims for convenience. It should be clear that any other suitable fluid medium, such as gases or liquids, may be used to practice the concepts of this invention disclosed and claimed in the appended claims.

I claim:
1. A vehicle suspension system comprising:
a plate-like chassis member;
a plate-like suspension member;
an air bag having a tapered cross-section in the direction of the length of the vehicle located between said chassis member and said suspension member;

means coupling a vehicle axle to said suspension member such that the substantial portion of the vehicle load is applied at the widest cross-sectional portions of said air bag;
a chassis cross member located at an end of said vehicle;
a bumper plate hingedly coupled to said cross member; and a bumper air bag in air-communication with said suspension air bag and interposed between said chassis cross member and said bumper plate.

2. A suspension system according to claim 1 wherein said bumper air bag is secured to both said chassis cross member and to said bumper plate to maintain same in position.

3. A vehicle suspension system comprising:
a plate-like chassis member;
a plate-like suspension member;
an air bag having a tapered cross-section in the direction of the length of the vehicle located between said chassis member and said suspension member;

means coupling a vehicle axle to said suspension member, including a lever arm coupled between said axle and said suspension member, such that the substantial portion of the vehicle load is applied at the widest cross-sectional portions of said air bag;
a chassis cross member located at an end of said vehicle;
a bumper plate hingedly coupled to said cross member; and
a bumper air bag in air-communication with said suspension air bag and interposed between said chassis cross member and said bumper plate.

* * * * *